United States Patent [19]

Temesvary

[11] 4,368,817
[45] Jan. 18, 1983

[54] UNITARY HINGED BOX-TYPE CONTAINER

[75] Inventor: Louis Temesvary, Los Altos, Calif.

[73] Assignee: Verbatim Corporation, Sunnyvale, Calif.

[21] Appl. No.: 198,640

[22] Filed: Oct. 20, 1980

[51] Int. Cl.³ ............... B65D 43/24; B65D 43/16; B65D 21/02
[52] U.S. Cl. ............... 206/45.2; 206/45.23; 206/311; 206/387; 220/4 B; 220/335; 220/337; 220/339; 220/23.4
[58] Field of Search ............... 220/4 B, 23.4, 335, 220/337, 339; 206/45.2, 45.23, 310, 311, 387

[56] References Cited

U.S. PATENT DOCUMENTS

| | | | |
|---|---|---|---|
| 1,209,343 | 12/1916 | Shampanien | 206/45.23 |
| 1,850,887 | 3/1932 | Laumonier | 206/45.23 |
| 2,785,797 | 3/1957 | Rice | 206/310 |
| 3,242,334 | 1/1969 | Goltz | 220/23.4 |
| 3,265,453 | 8/1966 | Seide | 206/311 |
| 3,414,157 | 12/1968 | Wright | 220/339 |
| 3,415,407 | 12/1968 | Alden | 220/4 B |
| 3,900,106 | 8/1975 | Cantales | 220/339 |
| 4,011,940 | 3/1977 | Neal | 220/337 |
| 4,184,594 | 1/1980 | Hehn | 220/339 |
| 4,294,558 | 10/1981 | Errichiello | 220/339 |

Primary Examiner—George E. Lowrance
Attorney, Agent, or Firm—Thomas E. Schatzel

[57] ABSTRACT

An improved unitary hinged box-type container for enclosing contents such as flexible disk packages including complementary top and bottom portions, connected by an integral intermediate hinge, which mate together to form an enclosed box in the closed position and further including an open position locking device for securing the container in an open position with the top portion rotated approximately 270° about the hinge from the closed position.

9 Claims, 9 Drawing Figures

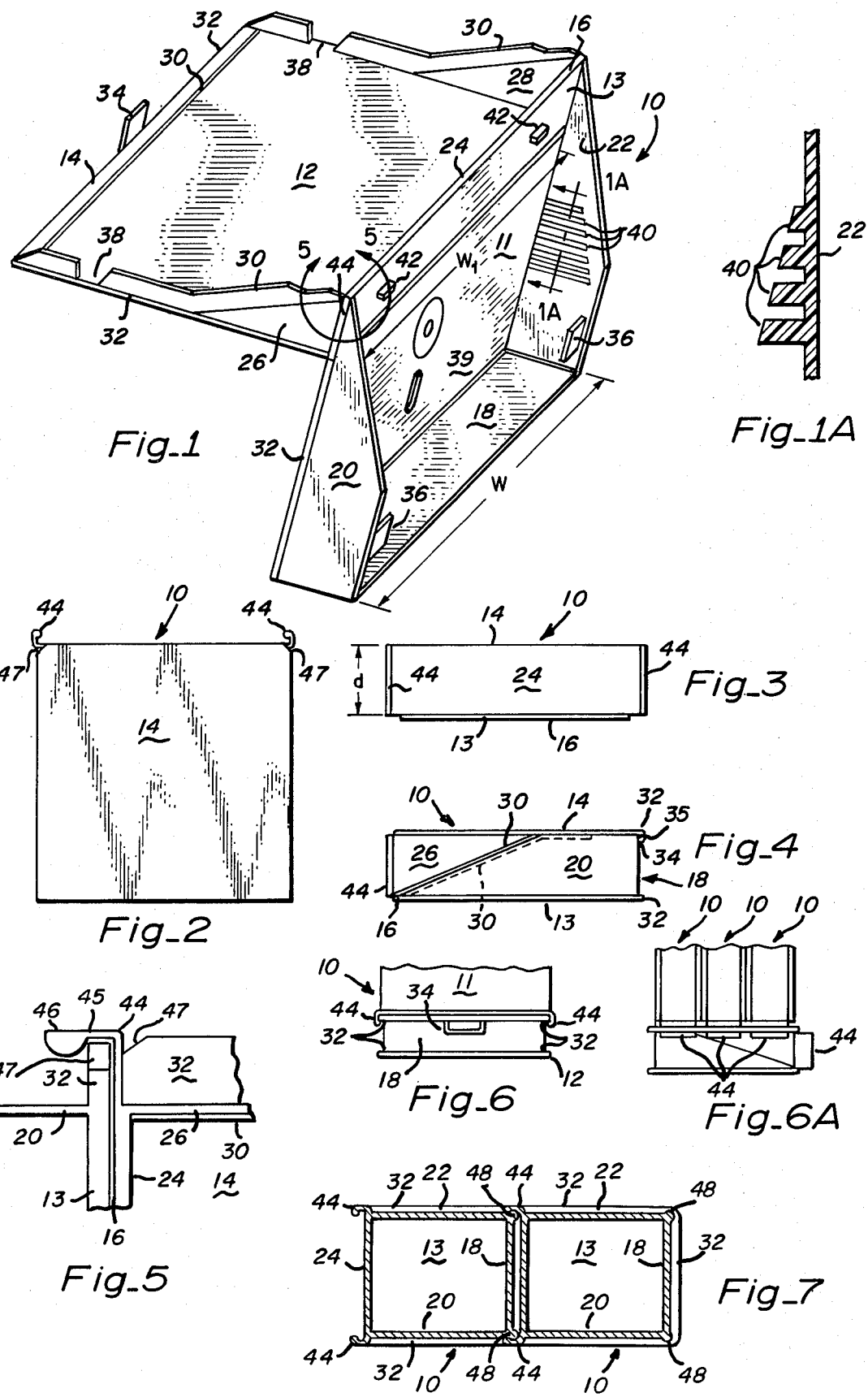

UNITARY HINGED BOX-TYPE CONTAINER

BACKGROUND OF THE INVENTION

1. Field of the Invention

The present invention relates to enclosed containers and more specifically to book-type enclosed containers including a device for flexibly securing the container in an open position.

2. Description of the Prior Art

The container industry is one of today's largest industries. Packaging and storage of various materials is a common necessity. It is also frequently useful to provide specific containers for various items that maximize convenient access to materials contained therein while still providing adequate protection against environmental elements.

Many modern products, such as magnetic information storage disks for use with data processing memory equipment, require convenient and readily accessible but nonetheless safe storage while not in use. It is desirable to provide a storage container wherein the labels on the disks or other materials may be reviewed without having to remove the contents from the container. Containers used for such purposes must also provide protection against impact and dust damage. It is also desirable that containers for these purposes have a stable orientation in the open position such that materials may be supported in a position wherein they may be readily reviewed without concern for slippage or damage of the materials.

Various prior art devices have attempted to address these problems. A binder device for storing sound recordings described in U.S. Pat. No. 2,439,868, issued to S. Segal, illustrates one such attempt. The binder device of S. Segal utilizes a flexible exterior cover which may be folded over to protect the contents or folded back to form an "A-shaped" display support position. Such a device, being open in nature, provides little protection against dust. Furthermore, the Segal device is entirely dependent upon the friction between the edge of the folder element and the surface and upon the rigidity of the hinge portion of the folder for stability in the display position. These characteristics are undesirable for use with information storage media.

U.S. Pat. No. 4,084,690 issued to C. F. Pulse and U.S. Pat. No. 4,124,118 issued to J. H. Helm demonstrate packages for video disks, a species of storage media only slightly similar to information storage disks. In each of these devices, a recessed portion of a container is provided for storage of the disks. The containers are designed such that when closed they provide significant protection against dust incursion. However, neither of the video disk devices may be locked in an open position nor may the contents be readily examined without removal from the container.

U.S. Pat. No. 3,786,913 issued to D. Crawford illustrates the value of utilizing flexible materials for a container such that a snap interlock between various portions of the container may be achieved. The artist's paint box device of Crawford is designed to display various small items such as paint which must be kept in a horizontal position relative to gravity to avoid spillage. Since this orientation may ordinarily be obtained by resting the device upon a flat, horizontal surface, the device contains no open position locking mechanism. Other than illustrating the snap interlock properties of slightly flexible materials the Crawford disclosure has little impact upon the problems of containing and protecting information storage media.

The available prior art containers do not solve the most pressing problems of storage of magnetic disks for information storage particularly those of ready accessibility, light weight, ease of manufacture and protection against contamination. No prior art device provides for relatively complete protection against impact and environmental contaminants in the closed position while also providing a locking mechanism to hold the device in the open position such that the contents may be easily reviewed.

SUMMARY OF THE INVENTION

It is therefore an object of the present invention to provide a storage container which may be secured in the open position such that the contents may be readily reviewed.

It is a further object of the present invention to provide a container which may be manufactured as an integral unit.

It is another object of the prevent invention to provide a container which protects the contents against impact and environmental contaminant damage.

Briefly, a preferred embodiment of the present invention is an integrally molded book-like box container including an open position locking device for enclosing items such as magnetic disks used for memory storage in the data processing industry. The book-like box container includes a bottom cover portion and a top cover portion with an integrally formed hinge connecting the covers. Both the top and bottom cover portions include planar exterior cover panels, and side and end panels perpendicularly attached to the interior surfaces of the cover panels to form the sides of the box. The device also includes latching means for holding the box in the closed position, and a pair of flexible snap-over means for securing the container in an open position. The open position of the container occurs when the top cover portion is rotated 270 degrees upon the integral hinge from the closed position.

An advantage of the present invention is that when the device is locked in the open position the contents of the container may be viewed in a semi-upright position.

It is a further advantage of the present invention that the one-piece molding of the entire container makes the device economical to produce.

Another advantage of the present invention is that the container, in the closed position, provides excellent protection to the contents from impact or environmental contamination.

Yet another advantage of the present invention is that the snap-over latches provide for convenient and secure interlocking storage of a plurality of containers.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of a container in accordance with the present invention, and shown in the open position;

FIG. 1A is a cross-sectional view along the lines 1A—1A of FIG. 1;

FIG. 2 is a top view of the container of FIG. 1, shown in the closed position;

FIG. 3 is a back elevational view of the container of FIG. 1 when in the closed position;

FIG. 4 is a left side elevational view of the container of FIG. 1 when in the closed position;

FIG. 5 is a side elevational view of a hinge corner portion of the device showing the open position locking device in the locked orientation;

FIG. 6 is a side elevational view illustrating a pair of the containers interlocked in perpendicular orientation;

FIG. 6A is a side elevational view of a number of the containers shown in a perpendicular interlocking orientation; and FIG. 7 is a cutaway view of a pair of containers of an alternate embodiment and interlocked in a linear orientation.

DETAILED DESCRIPTION OF THE PREFERRED EMBODIMENT

A preferred embodiment of the present invention is an integrally formed book-like plastic container for enclosing magnetic disks for use in the data processing industry. The container is illustrated in the open position in FIG. 1 and is designated by the general reference character 10. The book-type container 10 is illustrated in FIG. 1 as being set upon a table surface. Container 10 is shown in its locked open position to illustrate the interior members of the container.

The book-type container 10 includes a bottom cover portion 11 and a top cover portion 12. Bottom cover portion 11 and top cover portion 12 each include a relatively thin planar cover panel, 13 and 14 respectively, with a rectangular shape. In the preferred embodiment, the cover panels 13 and 14 are square panels. An integrally formed flexible hinge 16 connects the top and bottom portions of the container 10 such that the portions may be rotated about the hinge with respect to one another.

Formed on the interior surface of bottom cover portion 11 and perpendicular to the panel 13 are a front panel 18, a bottom-left-side wing panel 20, and a bottom-right-side wing panel 22. Similarly, the interior of the top cover portion 12 has formed therewith a back panel 24, a top-left-side wing panel 26, and a top-right-side wing panel 28. Front panel 18 and back panel 24 are rectangular panels extending completely across the width of the container. Bottom-left-side wing panel 20 and top-left-side wing panel 26 are truncated at complimentary angles such that they mate together to complete a rectangular panel when the container 10 is closed. In the same manner, bottom-right-side wing panel 22 and top-right-side wing panel 28 are complimentarily angularly truncated.

Additionally, the top cover portion 12 includes, along the interior edges of top wing panels 26 and 28 and also along the interior front edge of top cover panel 14, a continuous dust guard ridge 30. The dust guard ridge 30 is positioned so that when the container 10 is closed, the ridge 30 fits angularly against the interior surface of the front panel 18, bottom-left-side wing panel 20 and bottom-right-side wing panel 22. This fit prevents the intrusion of dust or other contaminants along the seams.

Each of the panels 18, 20, 22, 26 and 28 is recessed slightly from the edges of bottom cover panel 13 and top cover panel 14. The degree of recess is less than that of the dust guard ridge 30 so that the dust guard ridge 30 is on the interior when the container 10 is closed.

Back panel 24 is not recessed. The recession of each of the panels and the dust guard ridge from the edges of bottom cover panel 13 and the top cover panel 14 create cover ridges 32. The cover ridges 32 extend completely around the exterior edges of the bottom cover panel 13 and the top cover panel 14 except along the back edges of the cover portions 11 and 12 as defined by the back panel 24 and the hinge 16.

Formed near the center of the front edge of top cover panel 14 is a latch flap 34. Latch flap 34 is positioned to mate with a latching ridge 35 (illustrated in FIG. 4) formed on the upper central surface of front panel 18. This mating of latching ridge 35 and latch flap 34 secures the container 10 in the closed position such that it does not inadvertently open.

Situated on the front interior portions of bottom-left-side wing panel 20 and bottom-right-side wing panel 22 are a pair of dust flaps 36 projecting normal to said panels. The small flaps 36 engage a pair of recesses 38 in the dust guard ridge 30 of the top cover panel 14 when the container 10 is closed.

The dust flaps 36 also aid in keeping the contents within the container 10. The illustrated contents of the container 10, as shown, include a number of magnetic floppy disk packages 39. The disk packages 39 will be retained within the confines of cover portion 12 by the dust flaps 36 so that they do not easily fall out of the container 10 when the container is opened. The dust flaps 36 are particularly useful when the container 10 is in the display orientation as illustrated in FIG. 1. The interior surfaces of bottom-left-side wing panel 20 and bottom-right-side wing panel 22 further include a number of rigid parallel positioning ridges 40 formed therewith. As illustrated in the cross-sectional view of FIG. 1A, positioning ridges 40 extend inward from the sides of the wing panels 20 and 22 to guide and position the magnetic disk packages 39 within the container 10. The thickness of positioning ridges 40 increases from the hindmost to the foremost so as to urge the disks 39 forward and inward as they are placed within the container 10. It is necessary that the box interior width "W" be slightly greater than the width "$W_1$" of the disk packages 39 such that the disk packages 39 do not interfere with the dust guard ridge 30 when the container 10 is being closed.

The position of the disk packages 39 within box 10 is also maintained by a pair of positioning posts 42 which are situated on and projecting from the back interior surface of bottom cover panel 13. The positioning posts 42 prevent the bottom disk package 39 in the container from interfering with the hinge mechanism 16.

Formed at the intersections of top-left-side wing panel 26 and top-right-side wing panel 28 and back panel 24 are a pair of gallows clasps 44. Gallows clasps 44 extend outward from the side edges of back panel 24 to form the mechanism by which the container is locked in an open position. Gallows clasps 44 snap over the cover ridges 32 on the back left and right side portions of bottom cover panel 13 to hold the container 10 in an open or display position when the top cover portion 12 has been rotated 270 degrees about hinge 16 from the closed position as illustrated in FIG. 1.

FIG. 2 is a top plan view of the container 10 in the closed position. This figure illustrates specifically the manner in which the gallows clasps 44 extend outward from the edges of top cover panel 14.

FIG. 3 is a back elevational view of the container 10 in the closed position. In this illustration it may be seen that the gallows clasps 44 are situated farther to the sides of back panel 24 than the fullest extent of hinge 16. It may also be seen that hinge 16 extends along nearly the entire length of the interface junction between back panel 24 and bottom cover panel 13.

FIG. 4 is a left side elevational view of the container 10 in the closed position. This figure further illustrates the manner in which the cover ridges 32 extend outward beyond the panels, e.g. note how it extends beyond the front panel 18. The manner in which the top and bottom wing panels interrelate in the closed position is also shown. It may be seen that the top-left-side wing panel 26 does not quite engage the bottom-left-side wing panel 20. However, the dust guard ridge 30, which has a depth thinner than the depth of the top-left-side wing panel 26 and is located at the interior edge of wing panel 26, forms an effective dust guard barrier in the slight gap at the seam between the interface of the wing panels. The method by which the container 10 is secured in the closed position is also illustrated in FIG. 4. It can be seen that the latching ridge 35 on the top center portion of front panel 18 mates with a conventional depression in latch flap 34 to hold the container in the closed position. However, the latch flap 34 and the front panel 18 are sufficiently flexible that slight pressure will cause the flap 34 and latching ridge 35 to disengage such that the container 10 may be opened.

FIG. 5 is a side view of a portion of the container 10 to illustrate the interaction between the gallows clasps 44 and the cover ridge 32 when the container is in the locked-open position, as shown in FIG. 1. The corner portion of the box 10 illustrated in FIG. 5 is contained within line 5—5 of FIG. 1. The orientation of FIG. 5 is obtained by viewing the corner portion from a position above the center of FIG. 1. It may be seen that each gallows clasps 44 is in the nature of a right angularly bent strip of material attached at one end to the back panel 24 and having formed therewith an arm member 45 and a restraining bulge 46 extending inward from the farther edge of the arm member 45. The gallows clasps 44 extends the entire width of top-left-side wing panel 26 at the point where it intersects back panel 24 so as to form a clasp of width approximately equal to the depth "d" of the container 10 (See FIG. 3). At the points nearest the corners of top cover panel 14 and bottom cover panel 13, the cover panels are diagonally cut to remove the corner portion and form a pair of angular interconnect edges 47 to prevent interference with the gallows clasps 44.

When the container 10 is in the locked-open position as illustrated in FIG. 1, the cover ridge 32 of bottom cover portion 11, as it extends beyond bottom-left-side wing panel 20, fits between the extension of restraining bulge 46 and the angular portion of the gallows clasp 44. In this manner, the frictional restraint of the restraining bulge 46 induces the bottom cover panel 13 to maintain its relationship flat against the outer surface of the back panel 24. This relationship occurs when the top cover portion 12 of the container 10 has been rotated 270 degrees about hinge 16 from the closed position. The material of gallows clasps 44 is sufficiently flexible that moderate force will release cover edge 32 from the gallows clasp 44. Thus, the lock formed by the interaction of the gallows clasp 44 and the cover ridge 32 may be created and destroyed with moderate direct force but will maintain the lock against oblique forces so that it firmly holds the container 10 in the open position.

FIG. 6 illustrates the manner in which the gallows clasps 44 and the cover ridges 32 provide for an interlocking stacking relationship between two or more containers 10 when in the closed position. The gallows clasps 46 of one container 10 can interlock with any of the cover ridges 32 of another container 10 such that when a container 10 is placed perpendicularly relative to another container 10, the two may be interlocked. This interlock provides for secure storage of a plurality of containers into a single horizontal container as illustrated in FIG. 6A.

FIG. 7 is a cross-sectional view illustrating a further interlocking stacking arrangement of an alternative embodiment of a container of the present invention, referred to by the general reference character 10'. The containers 10' are similar to the containers 10 except that each includes a pair of posts 48 formed at the corners of the front panel 18. A pair of containers 10' may thus be linearly interlocked by the mating of the gallows clasps 44 with the pair of posts 48. The top cover panels 14 are cut away in FIG. 7 to show the manner in which the posts 48 are integrally formed with the front panel 18 and also the manner in which the interlock of the posts 48 and clasps 44 is formed.

The gallows clasps 44 may be used for secure stacking or storage in a number of ways. For example, the gallows clasps 44 may form interlocks, in addition to the manners illustrated in FIGS. 6, 6A, and 7, on a pair of spaced apart rails or ridges. Thus, the containers 10 may be very easily and securely stored.

It is also notable that the gallows clasps 44 of one container need not be attached to other containers 10 of the present invention in order to achieve the advantages created by the interlocking characteristics. The clasps may interlock with auxiliary structures.

The container 10 is normally utilized in an upright display orientation. In this orientation, the cover ridges 32 at the front edges of bottom cover portion 11 and top cover portion 12 form the points upon which the device rests on a support surface. In this orientation, for square bottom and top covers panels 13 and 14, the contents of the container 10 are displayed at an angle of approximately forty-five degrees (45°) from the horizontal. This position orientation makes it very easy for a person to flip through the contents of the container 10, typically magnetic disk packages 39, and select the desired disk package from within the pack without the necessity of removing from the container 10 the other disk packages stacked above it.

The book-like container 10 may be an integrally formed piece of polyolefin-type plastic. The preferred material is of polypropylene. The entire device is integrally molded in a single mold such that it fits upon itself properly. The shape of the cover portions 11 and 12 may be any shape as long as the covers include parallel opposing sides in the area of intersection with the gallows clasps 44. Rectangular shapes are the most common. The thickness of the top cover panel, the bottom cover panel, and the various other panels is approximately equal and in the preferred embodiment is about about one-fourth centimeter (one-tenth inch).

Although the container 10 of the present invention has been described for use with magnetic information storage disks, the container is equally applicable to any other application wherein it is desirable to easily lock the container in an open display position.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A hinged box-type container comprising:
   a bottom portion;
   a top portion adapted for mating in abutting relationship with the bottom portion to form an enclosed volume;
   hinge means connecting one edge of the top portion with one edge of the bottom portion such that the top portion may be pivoted about the hinge while remaining interconnected with the bottom portion from a closed position to an open position; and
   open position locking means formed to one of said portions for holding the bottom portion firmly to said top portion including a pair of parallel opposing protuberances extending from the sides of the bottom portion of the container near the back thereof and further including a pair of gallows clasps extending outward from the back corners and integrally formed with the top portion including a flexible gallows shaped extension having a post member attached to the top portion and a perpendicular arm member at the end of said post member and further having a restraining bulge at the end of the arm member thereof for flexibly snapping over the protuberance on the side of the bottom portion of the container when the top portion is rotated about the hinge means approximately 270° from the closed position whereby the bottom portion and the top portion establish a stable structure with the interiors of the portions exposed.

2. A hinged box-type container of claim 1, wherein the bottom portion includes a planar bottom cover panel, a front panel normal to said bottom cover panel and attached thereto and a pair of bottom side wing panels attached normal to both said bottom cover panel and said front panel.

3. A hinged box-type container of claim 2, wherein the top portion includes a planar top cover panel, a back panel normal to said top cover panel and attached thereto, a pair of top side wing panels attached normal to both said top cover panel and said back panel, said top wing panels shaped to mate with said bottom wing panels when the portions are in the closed position, and a dust guard ridge extending across the front interior of said top cover panel and extending backward to the front edge of said opposing side panels.

4. A hinged box-type container of claim 3, wherein each of said bottom side wing panels, said top side wing panels, and said front panel is recessed from the edge of said top and bottom covers, said opposing bottom and top side wing panels are obliquely truncated such that when the container is closed said top side wing panels and bottom side wing panels mate along the truncated edge to form complete rectangular panel members, and said top side wing panels further include dust guard ridges along the interior of the truncated edge thereof for preventing the incursion of dust or other contaminants into the interior through the seam between said top side wing panels and said bottom side wing panel along the truncated edge.

5. A hinged box-type container of claim 4, wherein the hinge means include an integrally formed flexible hinge extending along the bottom edge of said back panel and the back edge of said bottom cover panel and connecting said back panel to said bottom cover panel.

6. A hinged box-type container of claim 5, further including latching means engaged to the bottom portion and top portion for securing the container in the closed position.

7. A hinged box-type container comprising:
   a bottom portion including a planar bottom cover panel, a front panel normal to said bottom cover panel and attached thereto and a pair of bottom side wing panels attached normal to both said bottom cover panel and said front panel;
   a top portion including a planar top cover panel, a back panel normal to said top cover panel and attached thereto, a pair of top side wing panels attached normal to both said top cover panel and said back panel, each of said bottom side wing panels, said top side wing panels, and said front panel is recessed from the edge of said top and bottom covers, said opposing bottom and top side wing panels are obliquely truncated such that when the container is closed, said top side wing panels and bottom side wing panels mate in an abutting relationship along the truncated edge to form complete rectangular panel members and an enclosed volume, and said top side wing panels further include dust guard ridges along the interior of the truncated edge thereof and extending across the front interior of said top cover panel for preventing the incursion of dust or other contaminants into the interior through the seam between said top side wing panels and said bottom side wing panels along the truncated edge;
   hinge means including an integrally formed flexible hinge extending along the bottom edge of said back panel and the back edge of said bottom cover panel and connecting said back panel to said bottom cover panel such that the top portion may be pivoted about the hinge while remaining interconnected with the bottom portion from a closed position to an open position; and
   open position locking means formed to one of said portions including a pair of gallows clasps attached at the intersections of said back panel and said top side wing panels and extending outward therefrom so as to snap over the portion of said bottom cover extending outward from said bottom side wing panels for holding the bottom portion firmly to said top portion in a position with the top portion rotated about the hinge means approximately 270° from the closed position whereby the bottom portions and top portions establish a stable structure with the interiors of the portions exposed.

8. A hinged box-type container of claim 7 wherein each said gallows clasp includes a post member perpendicular to said top side wing panel and attached to the outside edge of said back panel and an arm member normal to said post member and attached to the other end of said post member.

9. A hinged box-type container of claim 8 wherein each said gallows clasp further includes a restraining bulge on the interior end surface of said arm member for snapping over the edge with said bottom cover.

* * * * *